United States Patent
Wiman et al.

(10) Patent No.: US 7,008,148 B2
(45) Date of Patent: Mar. 7, 2006

(54) CUTTING INSERT FOR CHIP REMOVING MACHINING

(75) Inventors: Jörgen Wiman, Sandviken (SE); Ronnie Löf, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 51 days.

(21) Appl. No.: 10/259,383

(22) Filed: Sep. 30, 2002

(65) Prior Publication Data

US 2003/0077131 A1     Apr. 24, 2003

(30) Foreign Application Priority Data

Oct. 1, 2001   (SE) .................................. 0103254

(51) Int. Cl.
  *B23B 27/06*      (2006.01)
(52) U.S. Cl. ................. 407/113; 407/114; 407/115
(58) Field of Classification Search ............. 407/113, 407/114, 115, 116
  See application file for complete search history.

(56) References Cited

U.S. PATENT DOCUMENTS

| | | | |
|---|---|---|---|
| 4,681,488 A | | 7/1987 | Markusson |
| 4,880,338 A | | 11/1989 | Stashko |
| 5,044,840 A | * | 9/1991 | Fouquer et al. ............. 407/114 |
| 5,226,761 A | | 7/1993 | Satran et al. |
| 5,388,932 A | * | 2/1995 | DeRoche et al. ........... 407/113 |
| 5,634,745 A | | 6/1997 | Wiman et al. |
| 5,743,681 A | | 4/1998 | Wiman et al. |
| 5,788,427 A | | 8/1998 | Zitzlaff et al. |
| 6,217,263 B1 | | 4/2001 | Wiman et al. |
| 6,244,791 B1 | | 6/2001 | Wiman et al. |
| 6,527,486 B1 | * | 3/2003 | Wiman et al. .............. 408/188 |
| 6,623,217 B1 | * | 9/2003 | Brockett et al. ............ 407/114 |
| 6,715,967 B1 | * | 4/2004 | Wiman et al. .............. 407/114 |

FOREIGN PATENT DOCUMENTS

| | | | |
|---|---|---|---|
| SE | WO09532071 | * | 11/1995 |
| SU | 1 782 196 | | 12/1992 |
| WO | WO 95/00272 | | 1/1995 |
| WO | WO 00/21704 | | 4/2000 |

* cited by examiner

*Primary Examiner*—Boyer D. Ashley
*Assistant Examiner*—Dana Ross
(74) *Attorney, Agent, or Firm*—Drinker Biddle & Reath LLP

(57) ABSTRACT

A cutting insert, intended for chip removing machining, includes a body delimited by two opposite, first and second surfaces, which in the operative state of the cutting insert form an actively chip removing top surface and a bottom surface, respectively. The insert also includes at least one side surface, serving as a flank surface, which extends between the first and second surfaces. A cutting edge is formed between the flank surface and at least one of said first and second surfaces, in which a segment is included, which has the purpose of smoothening and facing the machined surface of the workpiece. The smoothening edge segment is divided into at least three different part edge segments, a first of which forms a tangent point and is surrounded by two part edge segments having longer radii ($R_{22}$, $R_{23}$) than the first edge part segment.

18 Claims, 6 Drawing Sheets

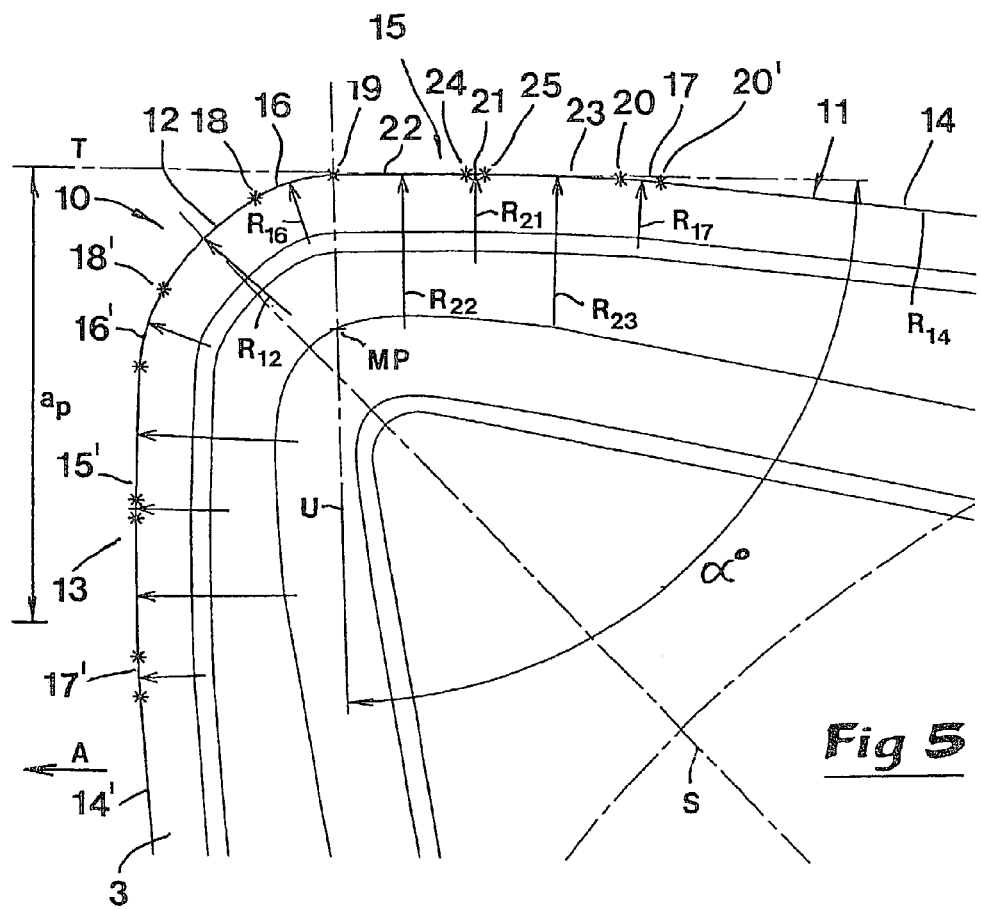
Fig 5
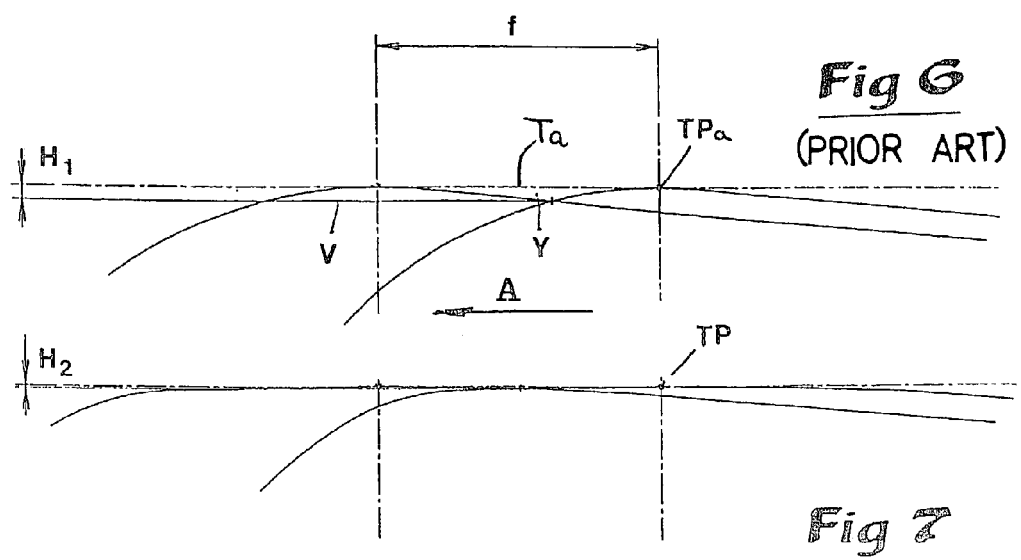
Fig 6 (PRIOR ART)
Fig 7

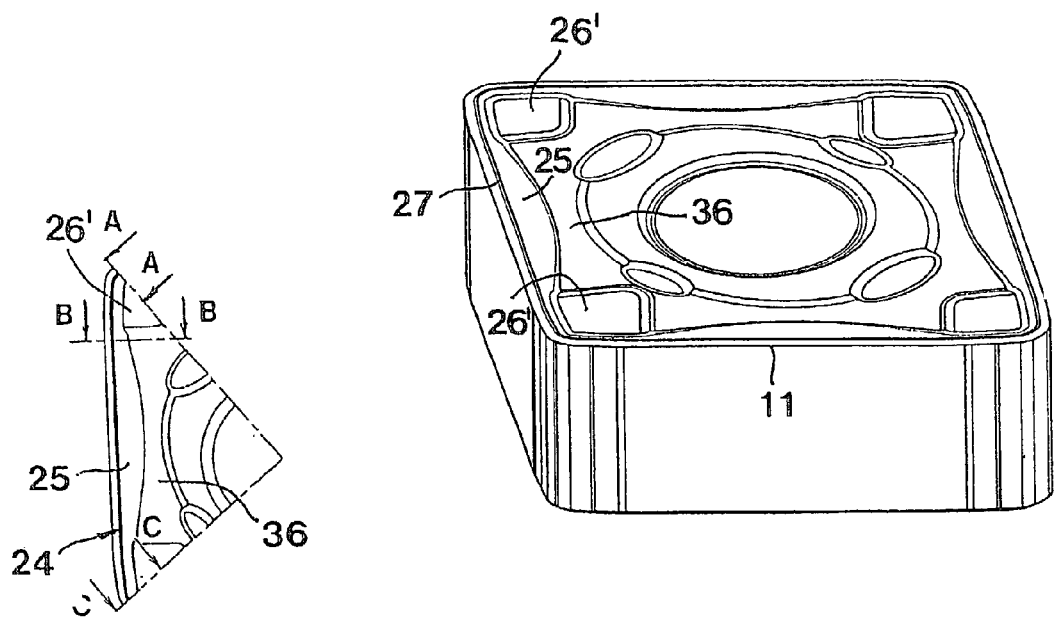
Fig 10   Fig 11
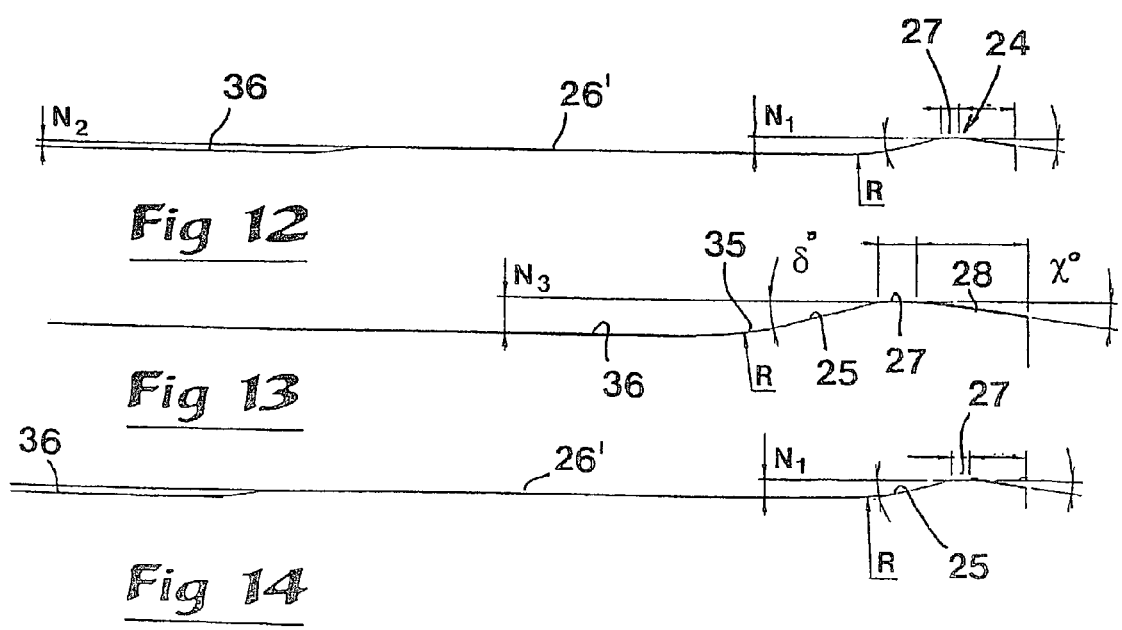

CUTTING INSERT FOR CHIP REMOVING MACHINING

RELATED INVENTION

This application claims priority under 35 U.S.C. §119 to patent application Ser. No. 0103254-9 filed in Sweden on Oct. 1, 2001, the entire content of which is hereby incorporated by reference.

This invention is related to that disclosed in application Ser. No. 10/259,307.

TECHNICAL FIELD OF THE INVENTION

This invention relates to a cutting insert, intended for chip removing machining of workpieces, of the type that comprises a body that is delimited by on one hand two opposite, first and second surfaces, which in the operative state of the cutting insert form an actively chip removing top surface and an inactive bottom surface, respectively, and on the other hand at least one side surface serving as a flank surface that extends between said first and second surfaces. A cutting edge is formed between the flank surface and at least one of said first and second surfaces, in which a segment is included, which has the purpose of smoothening and facing the machined surface of the workpiece.

Cutting inserts of the above generally mentioned kind may be of a round (circular or oval) as well as a polygonal basic shape. In the last-mentioned case, the cutting body is defined by at least three (usually plane or slightly curved) side surfaces or flank surfaces that extend between said first and second surfaces, whereby nearby flank surfaces transform into each other via a convexly rounded nose to which at least one cutting edge connects, which is divided into a plurality of segments having different radii, viz. a first edge segment in the immediate vicinity of the actual nose, a second edge segment that is located on one side of the nose, a third edge segment located on the opposite side of the nose, which is arranged to release at a certain clearance angle from a machined surface on the workpiece, as well as a fourth edge segment located between the first and third edge segments, that fulfils the purpose of smoothening and facing the machined surface of the workpiece.

In practice, a cutting geometry surface is connected to the individual edge on the cutting insert—regardless if this is of a round or polygonal basic shape—which is generally parallel to an imaginary reference plane through the cutting body, and which, counted from the edge, includes a primary chamfer that transforms into a chip removing surface that is inclined in the direction inwards/downwards in order to permit sinking of a chip being under formation, and which transforms into a deflection surface arranged to be met by the chip and at least initiate deflection or guiding away of the same from the cutting insert. If the cutting insert is single-sided, a cutting geometry surface of that kind is present merely on the top side of the body, while the bottom side has a plane support surface. If the cutting insert is double-sided, cutting geometry surfaces of that kind exist at the top as well as at the bottom of the cutting insert.

PRIOR ART

Cutting inserts of the kind in question that constitute replaceable wearing parts and are detachably mounted in different kinds of holders for cutting tools, may be used industrially for highly varying purposes, such as milling, drilling, broaching, turning and the like. The workpieces that are machined usually consist of metal, whereby the cutting inserts are made from a hard, hardwearing material, such as cemented carbide, silicon nitride, aluminum oxide, etc., while the holders of the tools are made from a more elastic material, in particular steel.

For one of the exemplified fields of application, viz. turning, the interaction between the feeding of the cutting insert and the design of the cutting edge is of great importance for several aspects of the operation outcome. Generally, a nose having the largest possible radius should be chosen at rough turning, with the purpose of achieving a strong cutting edge. However, too large a nose radius may cause vibrations and detrimental generation of heat. Therefore, at smooth turning, a smaller nose radius is advantageously selected; usually smaller than 2 mm. A disadvantage of a small nose radius, however, is that the wear of the cutting insert is hastened, whereby the service life and performance thereof are deteriorated.

Another factor that is effected by the interaction between the nose radius and the feeding is the surface finish of the rotary workpiece. Particularly important in this respect is the surface smoothening edge segment that is present on at least one of the sides of the actual nose (asymmetrical nose) or on both sides of the nose (symmetrical nose) on polygonal cutting inserts. Investigations that form the basis of the present invention have shown that the so-called tangent point of the smoothening edge segment has a particularly great importance for the surface finish. This tangent point is the geometrical point along the smoothening edge segment that is located at the shortest distance from the rotation axis of the workpiece during turning.

In previously known turning inserts (see, for instance, Publication WO 95/00272; U.S. Pat. No. 6,217,263; U.S. Pat. No. 5,226,761; Swedish Applications SE-9401732-4, SE-9702501-9 and Russian Document SU-1-782-196), the surface smoothening edge segment is usually arched and extends as a continuous line between on one hand, the point where this edge segment directly or indirectly transforms into the actual nose edge and on the other hand, the point where the same directly or indirectly transforms into the edge segment that releases at a certain clearance angle from the machined surface of the workpiece. In practice, the length of the surface smoothening edge segment should substantially be equally large as the feeding, i.e., the axial distance that the cutting insert covers during one revolution of rotation of the workpiece. An annoying circumstance in regards of the surface finish in previously known cutting inserts is that the position of the actual tangent point along the surface smoothening edge segment has not been able to be predetermined. Thus, the actual tangent point may "drift" in an uncontrollable way between the two opposite ends of the edge segment and in this connection give rise to varying surface finish.

In order to guarantee an acceptable surface finish, the feeding has in previously known cutting inserts been limited to maximally 0.6 or 0.7 mm/rev. Theoretically, it is in feasible, per se, to enable high feedings with straight smoothening edge segments, but in practice this way is objectionable so far that straight edge segments with a smoothening function involves large radial cutting forces with the ensuing risk of vibrations and high generation of heat.

Another disadvantage of previously known turning inserts relates to the cutting geometry surface adjacent to the active cutting edge. Generally, the "topography", i.e., the elevation differences between the highest and lowest located points, respectively, of the cutting geometry surface have been coarse or markedly undulating, on one hand so far that the angle of inclination of the chip removing surface in connection with the primary chamfer of the edge has been comparatively large (approx. 20° or more), and on the other hand so far that the elevation difference between different tumblings or ridges having a chip breaking or guiding function and the valleys or bottoms situated deepest of the cutting geometry surface have amounted to measures being considerable in this context (0.5 mm or more). In said tumblings and ridges, respectively, protruding high up from the bottom regions of the cutting geometry surface, heat concentrations occur, which inter alia lead to crack formations in the cutting insert, and thereby a shortened service life thereof.

AIMS AND FEATURES OF THE INVENTION

The present invention aims at obviating the above-mentioned disadvantages of previously known cutting inserts and at providing an improved cutting insert. Therefore, a primary aim of the invention in a first aspect is to provide a cutting insert that generally guarantees an improved surface finish of the machined surface of a workpiece. In the embodiment thereof as a turning insert, this possibility should for instance be utilized for a radically increased feeding with a retained or even improved surface finish. In an analogous way, the invention should be able to be utilized for general performance increase of cutting inserts having a surface smoothening edge segment also for other machining techniques than turning, such as milling, drilling, broaching or the like. In a second aspect, the invention further aims at improving the cutting geometry surface adjacent to the operatively active cutting edge of the cutting insert, more precisely by minimizing the risk of heat concentrations and crack formations in the material of the surface zone of the cutting insert.

At least the primary aim of the invention is attained by a cutting insert for chip removing machining of workpieces. The insert comprises a body having opposite first and second surfaces interconnected by at least one side surface. When the insert is in an operative cutting state, the first and second surfaces form a chip removing top flank surface and an inactive bottom flank surface, respectively. The top flank surface forms a cutting edge with the at least one side surface. The cutting edge includes a surface-smoothing segment for smoothing a cut surface of the workpiece. The surface-smoothing segment includes at least first, second, and third part edge segments defined by first, second, and third radii, respectively. The first part edge segment is disposed between the second and third part edge segments. Each of the second and third radii is longer than the first radius.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 5 is an extremely enlarged, partial view from above of a nose to a cutting insert made in accordance with the invention.

FIG. 6 is a schematic illustration of the motion pattern of the tangent point on a surface smoothening edge segment of a cutting insert according to prior art.

FIG. 7 is an analogous illustration showing the motion pattern of the tangent point at a cutting insert according to the present invention.

FIG. 10 is a perspective view of an alternative cutting insert according to the invention.

FIG. 11 is a partial, sector-like view from above of the cutting insert according to FIG. 10, whereby the location of three different sections A—A, B—B and C—C, are illustrated in the figure.

FIG. 12 is an enlargement of the section A—A.
FIG. 13 is an enlargement of the section B—B.
FIG. 14 is an enlargement of the section C—C.

DESCRIPTION OF PREFERRED EMBODIMENTS OF THE INVENTION

Figure 1:
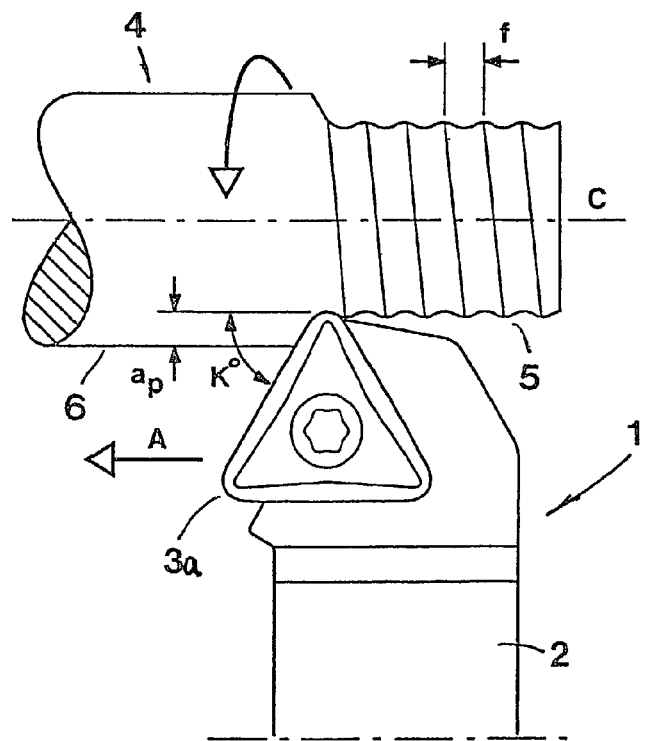
FIG. 1 is a schematic illustration of the general principle of longitudinal turning.

In FIG. 1, a turning tool is shown schematically during machining of a workpiece. The machining in this case consists of longitudinal turning. The tool is in its entirety designated 1 and includes a bar or holder 2 as well as a replaceable cutting insert 3a. The workpiece 4 is rotatable around a geometric axis C. A machined, cylindrical surface 5 on the workpiece typically has wave formations, shown in drastically exaggerated scale in FIG. 1, which detract from the surface finish. The distance between the tops of these wave formations is a function of the feeding f of the cutting insert 3a, which is measured in mm/revolution. Furthermore, $a_p$ designates the cutting depth that constitutes the radial difference between the machined surface 5 and the unmachined surface 6, as measured perpendicularly to the feeding direction of the tool (see the arrow A). The side angle K° is the angle between the main cutting edge of the cutting insert and the feeding direction.

Figure 2:
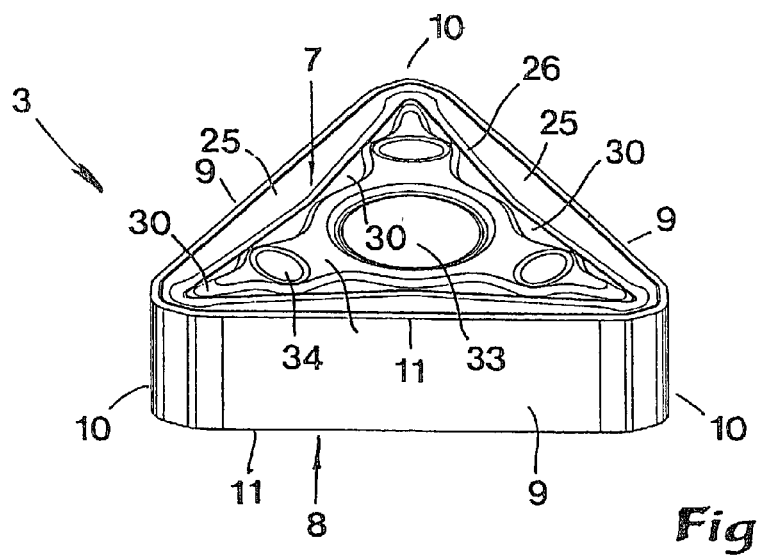
FIG. 2 is a perspective view of a polygonal, particularly triangular cutting insert according to the invention.

Reference is now made to FIG. 2, which illustrates a cutting insert 3 according to the invention. The cutting insert in this case consists of a body having a polygonal, more precisely triangular basic shape that is delimited by two opposite, first and second surfaces 7, 8, as well as three side surfaces 9 serving as flank surfaces. In the operative state of the cutting insert, i.e., during turning, the upwardly turned first surface 7 forms an active chip removing top surface, while the opposite lower surface 8 is inactive. The active chip removing surface 7 furthermore constitutes a cutting geometry surface having a unique, new design. If the cutting insert is single-sided, the surface 8 serves merely as a support surface having a substantially plane shape. In double-sided cutting inserts, both surfaces 7, 8 are formed as cutting geometry surfaces.

Nearby flank surfaces 9 transform into each other via curved corners which include respective convexly rounded noses, generally designated 10. Between the upper cutting geometry surface 7 and the flank surfaces 9, a continuous cutting edge 11 is formed. In each corner, the cutting edge is divided into a plurality of segments having different radii as discussed below. The different segments of the edge are effected through convenient shaping of part surfaces with a different curvature, as clearly is shown along the flank surface 9 in the area of the noses 10 in FIG. 2. The formation of these curved part surfaces may be effected by grinding, direct pressing, injection molding or in other ways.

The cutting geometry surface 7, illustrated in an enlarged state in FIG. 3, will be described in detail later in this disclosure.

Figure 5A:
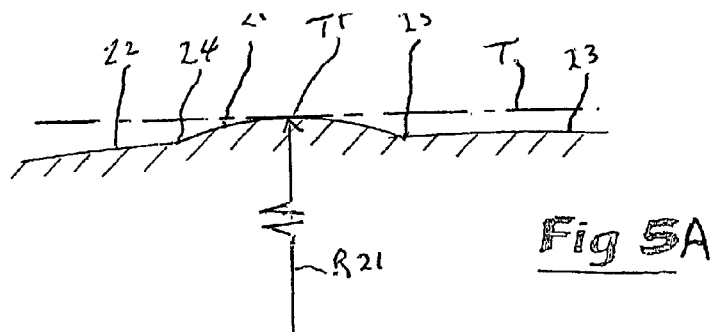
FIG. 5A is an enlarged fragmentary view of a portion of a smoothing edge segment of the insert of FIG. 5.

Reference is now made to FIGS. 5–7, which illustrate the fundamental features of the present invention more in detail. In FIG. 5, a symmetrically formed nose is exemplified, the different edge segments of which on both sides of a bisector or symmetry line S have identical shape. The symmetry line S extends at an acute angle (in this case approximately 45°) to an imaginary tangent line T that is parallel to the rotation axis C of the workpiece. The tangent line T is also tangent to a part edge segment 21 of the insert as will be later explained (see FIG. 5A). The curved cutting edge 11, active in the operative state, is divided into a plurality of segments having different radii, viz. a first edge segment 12 defining the actual nose 10, a second edge segment 13 that is located on one side of the nose or symmetry line S, a third edge segment 14 located on the opposite side of the nose, which third edge segment is arranged to release at a certain clearance angle from the machined surface 5 of the workpiece, as well as a fourth edge segment 15, located between the first and third edge segments 12, 14, which has the purpose of smoothening or facing the machined surface of the workpiece. In this connection, it should be pointed out that the cutting insert 3 in FIG. 5 is meant to move from the right to the left in the same way as in FIG. 1. In other words, the cutting insert is fed in the direction of the arrow A, whereby a feasible cutting depth is indicated at $a_p$.

In this case, a transition edge segment 16 extends between the nose edge segment 12 and the surface smoothening edge segment 15. Another transition segment 17 extends between the surface smoothening edge segment 15 and the third edge segment 14.

The different edge segments extend between end points, which for the sake of clarity are in the form of enlarged stars. Thus, the first edge segment 12 extends between end points 18, 18', while the surface smoothening, fourth edge segment 15 extends between end points 19, 20. The third edge segment 14 extends from an end point 20' and towards the right in FIG. 5. In the symmetrical embodiment which is exemplified in FIG. 5, the second edge segment designated 13 extends downwards from the point 18', and has a shape that is determined by edge segments 16', 15', 17' and 14' (which have their equivalents on the opposite side of the symmetry line S). Thus, at the feeding direction A, the edge segment 13 performs the principal chip removing machining, while the edge segment 15 is surface smoothening. However, thanks to the symmetrical design of the nose, the cutting insert may also be used in a mirror-inverted way, whereby the edge segment 15' becomes surface smoothening.

The radius of the edge segment 12 is designated $R_{12}$. In an analogous way, the radius of the edge segment 16 is designated $R_{16}$ and the radii of the edge segments 17 and 14, are designated $R_{17}$ and $R_{14}$, respectively. In this connection, it should be pointed out that the edge segment 14 may be straight, whereby the radius $R_{14}$ is infinity.

In previously known cutting inserts having arched or convex surface smoothening edge segments 15, said edge segment 15 has continuously extended as a line between the end points 19, 20 thereof. Contrary to this, the edge segment 15 according to the present invention is divided into at least three different part edge segments, the first one 21 of which, having a certain radius $R_{21}$, is surrounded by two part edge segments 22, 23 having greater radii $R_{22}$ and $R_{23}$, respectively. The first part edge segment 21 extends between end points 24, 25 which are located comparatively near each other. In other words, the part edge segment 21 is comparatively short. Thus, in practice, the length of the first part edge segment 21 may amount to 1–15%, conveniently 5–10% of the total length of the fourth edge segment 15 between the points 19, 20.

According to a preferred embodiment of the invention, each of the second and third part edge segments 22, 23 should have a radius that is at least 3, and preferably 5–10, times greater than the radius of the first part edge segment 21. The radii $R_{22}$, $R_{23}$ may either be equally large or of different sizes. However, it is to advantage if the second and third part edge segments 22, 23 are equally long. In this way, the first part edge segment 21 is located halfway between the opposite ends 19, 20 of the edge segment 15.

The part edge segment 21 forms the tangent point TP (see FIG. 5A) of the cutting insert against the workpiece, i.e. the point on the cutting edge which is absolutely closest to the rotation axis C of the workpiece. Because the radius $R_{21}$ is smaller than the radii $R_{22}$ and $R_{23}$, the part edge segment 21 will (on a microscopic scale) project like a tappet from the surrounding, flatter part edge segments 22, 23. Therefore, irrespective of minor maladjustments of the cutting insert, the tangent point TP will be located at a predetermined, non-variable distance from the end point 19 as well as from the end point 20. An imaginary line U extends transversely to the tangent line T, which line U intersects both the end point 19 and the geometric center of the transition segment 16 (i.e., the origin of the radius $R_{16}$), which radius $R_{16}$ determines the shape of the transition segment 16 between the edge segments 12 and 15. The angle ∞ between the lines T and U should, according to a preferred embodiment of the invention, be less than 90°. In practice, the angle may be within the range of 86–89° and conveniently amount to approx. 88°.

Below, examples of specific dimensions of the radii that define the different edge segments follow. When $R_{12}$ is 1.6 mm, $R_{16}$ may be 0.8 mm. $R_{21}$ may amount to 5 mm, while $R_{22}$ as well as $R_{23}$ may amount to 30 mm. Furthermore, $R_{17}$ may be 4 mm and $R_{14}$ may be infinity.

Reference is now made to FIGS. 6 and 7, which illustrate the difference of surface finish between conventional cutting inserts and the cutting insert according to the invention. In FIG. 6, it is illustrated how the tangent point TPa on a surface smoothening edge segment of a cutting insert according to prior art may move between a first depth (in the workpiece) defined by the ideal tangent line Ta to a second depth defined by the line V that gives rise to a considerable ridge Y between nearby, concave bottoms in the machined surface. The difference $H_1$ between said depths may amount to 0.05 mm or more.

In the cutting insert according to the present invention, the difference $H_2$ between the maximum and minimum depth of the tangent point TP, i.e. the edge part segment 21, amounts to merely approx. 0.008 mm (see FIG. 7). Thus, the fact that the edge part segment 21 always preserves a well-defined location along the surface smoothening edge segment 15 implies a considerable enhancement of the surface finish.

This effect may, per se, be utilized merely to improve the surface finish, but a much more interesting possibility in practice is to increase the feeding "f" with retention of previously acceptable surface finish. Thus, performed experiments have shown that the feeding of a given cutting insert may be increased from the conventional 0.6 or 0.7 mm/rev to a greater rate of 1.0–1.2 mm/rev or more without the surface finish being deteriorated. To be able to increase the feeding by 50–100% with retained surface finish in this way of course implies a considerable reduction of the machining times and a radical enhancement of the strength and performance of the cutting insert.

Figure 8:
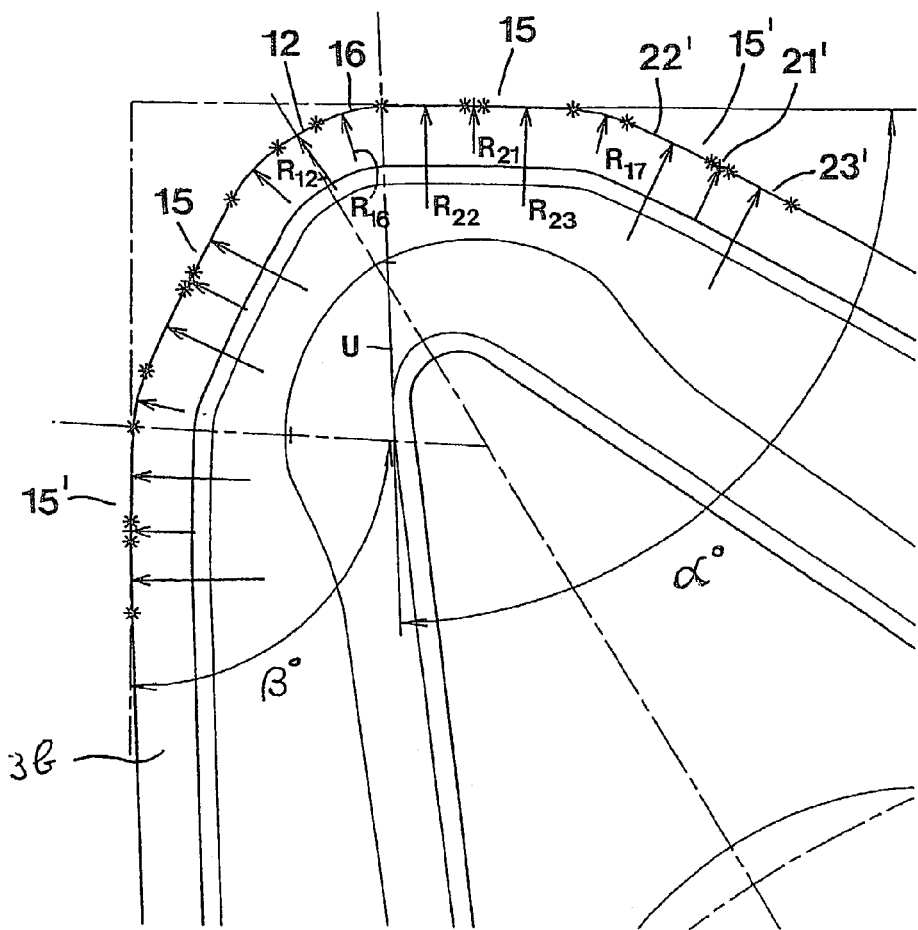
FIG. 8 is a view corresponding to FIG. 5 showing an alternative insert nose according to the invention.

In FIG. 8, an alternative embodiment of a nose in a polygonally shaped cutting insert 3b according to the invention is shown. In this case, the different edge segments and edge part segments have the following radii: $R_{12}=1.6$, $R_{16}=0.8$ mm, $R_{22}=12$ mm, $R_{21}=4$ mm, $R_{23}=12$ mm, $R_{17}=0.8$ mm. In the example, a secondary edge segment 15' with smoothening function is formed on the same side of the actual nose edge segment 12 as the smoothening edge segment 15, which like the edge segment 15 is divided into three different part edge segments 22', 21' and 23', having the same radii $R_{22}$, $R_{21}$ and $R_{23}$.

On the other side of the edge segment 12, there are two similar edge segments, 15 and 15', respectively. Also in this case, the angle ∞ may amount to 88°, while the corresponding angle β on the portion of the cutting insert which is shown to the left in FIG. 8 may be smaller, e.g. 87°.

Figure 9:
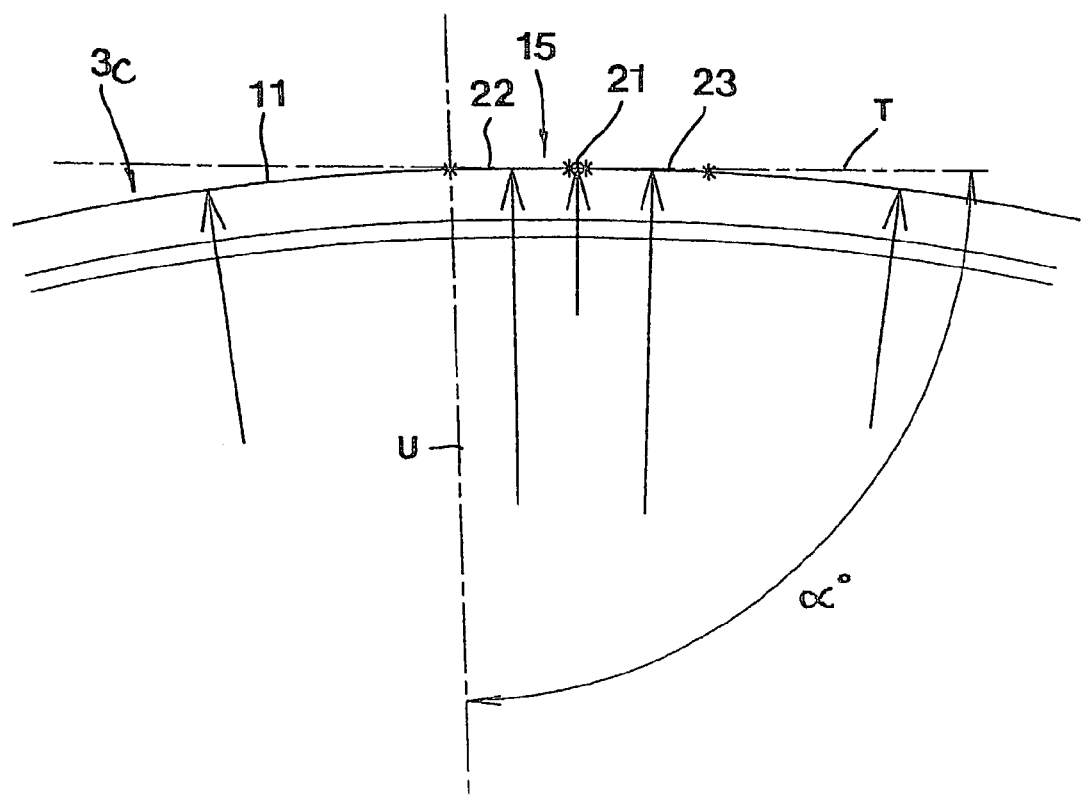
FIG. 9 is a detailed enlargement showing the invention applied to a circular cutting insert.

In FIG. 9, it is schematically exemplified how the invention also may be applied to round (circular or elliptical) cutting inserts 3c. Thus, along the continuous, substantially circular (or elliptical) edge 11 of the cutting insert, there is at least one edge segment 15, having the same design as in the preceding examples. In other words, the edge segment 15 is divided into three different part edge segments 21, 22, 23, the first-mentioned one of which has a smaller diameter and is shorter than the two surrounding part edge segments 22, 23. Also in this case, the angle ∞ between the tangent line T and a line U which intersects a point in the transition between the edge 11 and the part edge segment 22, is smaller than 90°, e.g. 88°.

It should also be mentioned that the flank surfaces 9 of the cutting insert (see FIG. 2 again) may be either neutral, i.e. extend perpendicularly to an imaginary reference plane halfway between the top and bottom sides of an insert of uniform thickness, or positive, i.e. extend at an acute angle inwards from the cutting edge 11. In double-sided cutting inserts, the flank surfaces 9 are usually neutral, while single-sided cutting inserts at times have a positive clearance geometry.

As has been mentioned in the introduction, previously known cutting inserts, inter alia turning inserts, have cutting geometry surfaces with a marked "undulating topography", i.e. surfaces having chip guiding ridges, tumblings or other projections that protrude high above the deepest situated valleys or bottoms of the surface. In a particular aspect, the present invention aims at obviating the drawbacks that are associated with cutting inserts of such a kind, viz. the tendency of heat concentrations in the abruptly protruding projections, with the ensuing risk of crack formations. Generally, this problem is solved by the fact that the cutting insert in the below-described way is formed with a shallow, soft cutting geometry surface.

Figure 3:
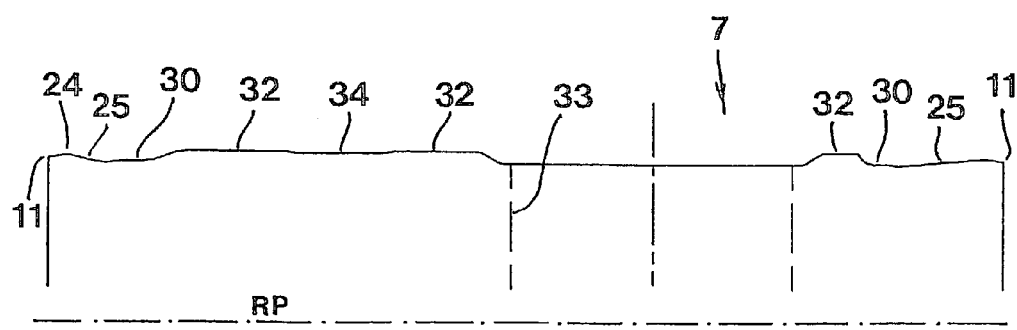
FIG. 3 is an enlarged section through a cutting geometry surface, visible from above, of the cutting insert according to FIG. 2, whereby the section extends in a bisector-like way through a hole in the cutting insert as well as through a corner of the same.
Figure 4:
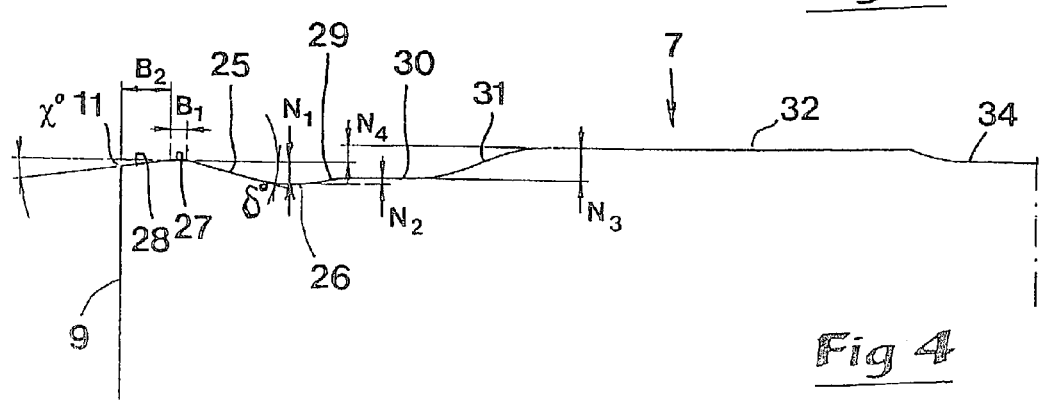
FIG. 4 is an additionally enlarged partial section of the cutting geometry surface in FIG. 3.

Initially, reference is made to FIGS. 3 and 4, which in enlargement illustrate the "topographical" design of the cutting geometry surface 7 of the cutting insert according to FIG. 2. In this case, the cutting insert is meant to be double-sided, whereby the two opposite surfaces 7, 8, between which the flank surfaces 9 separately extend, may serve as cutting geometry surfaces. This means that also the surface 8 has a cutting edge 11 that may be utilized for chip removing machining if the surface 8 is turned upwards in the operative state of the cutting insert. The continuing disclosure of the design of the cutting geometry surface is, however, carried out with reference being made merely to the surface 7 as this is shown in FIGS. 3 and 4.

Generally, the surface 7 is parallel to an imaginary center reference plane RP which in cutting inserts of a uniform thickness may consist of a central plane halfway between the surfaces 7 and 8 and parallel thereto.

Counted inwards from the cutting edge 11, the illustrated cutting geometry surface includes a primary chamfer, in its entirety designated 24, and a chip removing surface 25, which is inclined in the direction inwards/downwards in order to enable sinking of a chip being under formation. Said surface 25 transforms into a deflection surface designated 26, which is arranged to be met by the chip and at least initiate deflection or guiding away of the same from the cutting insert. In the shown example, the primary chamfer 24 is composed of two part surfaces, viz. a comparatively narrow chamfer surface 27 and a wider, negative chamfer surface 28 that extends at an obtuse angle to the chamfer surface 27 as well as the flank surface 9. The chamfer surface 27 is parallel to the reference plane RP, whereby the angle χ between the negative chamfer surface 28 and an imaginary plane in the extension of the chamfer surface 27 may amount to 7° or thereabout. The chamfer surface 27 may have a width $B_1$ of 0.1 mm, while the width $B_2$ of the chamfer surface 28 may be in the range of 0.2–0.6 mm, preferably 0.3–0.5 mm.

In the shown example, the deflection surface 26 forms a lowermost located bottom surface that via a concavely curved chip breaking surface 29 transforms into a plane land 30. Via a second transition surface 31, said first land 30 transforms into a second land 32, which surrounds the central hole 33 in the cutting insert (see FIG. 2). In the land 32, individual countersinks 34 are formed.

The angle of inclination (of the chip removing surface 25 in relation to the reference plane has in the previously known cutting inserts amounted to more than approx. 20° (usually at least 22°), in addition to which, the depth of the deflection surface 26, i.e. the elevation difference $N_1$ between the surface 26 and an imaginary plane parallel to the reference plane, in extension of the chamfer surface 27, has amounted to 0.5 mm or more.

In the cutting insert according to the present invention, the angle δ is within the range of 3–18°, conveniently 10–15°. In the example according to FIGS. 2–4, the angle δ amounts to 14°. Furthermore, the elevation difference $N_1$ between the chamfer surface 27 of the primary chamfer that is situated highest and the chip deflection surface 26 amounts to maximally 0.20 mm. It is to advantage if said elevation difference amounts to a measure within the range of 0.06–0.14 mm, preferably 0.090–0.125 mm. The elevation difference $N_2$ between the deflection surface 26, formed as a bottom, and the first land 30 may be within the range of 0.02–0.06 mm and advantageously amount to 0.04 mm.

The elevation difference between the bottom surface 26 and the second land 32 shall at double-sided cutting inserts always be greater than the elevation difference $N_1$ between the surface 26 and chamfer surface 27. In this way, the land 32 will protrude somewhat in relation to an imaginary plane extending parallel to the reference plane RP through the chamfer surface 27. In other words, the land 32 may serve as a lower support surface against a cutting seat surface without the primary chamfer 24 and the edge 11 making contact with the cutting seat surface. In practice, said elevation difference should be at least 0.05 mm greater than the elevation difference $N_1$.

In the concrete embodiment example according to FIGS. 2–4, the elevation difference $N_1$ amounts to 0.13 mm, $N_2$ to 0.04 mm and $N_3$ (between the lands 30 and 32) to 0.19 mm. In otherwords, the elevation difference $N_4$ between the land 32 and the chamfer surface 27 amounts to 0.10 mm.

The above-described geometry is present in the area of each individual nose 10 (see FIG. 2). At each straight cutting edge and flank surface, respectively, which is situated diametrically opposite a nose 10 (i.e. extends perpendicularly to an imaginary nose bisector through the center of the hole 33), the geometry is somewhat different. More precisely, the angle of inclination (of the chip removing surface 25 is here considerably smaller (see to the right in FIG. 3). Instead of 14°, this angle may be as small as 5°. In other words, the chip removing surface 25 extends at a considerably flatter angle in the area of the center thereof than further out towards the individual nose.

Furthermore, as is seen in the perspective image in FIG. 2, the disclosed cutting geometry surface 7 lacks every form of abruptly protruding tumblings or projections, in that the two lands 30, 32 consist of plane surfaces, the first-mentioned one 30 of which is situated very near the bottom surface 26 located deepest, and the second one of which 32 protrudes merely 0.10 mm above the plane of the primary chamfer of the edge, particularly the chamfer surface 27. Thanks to the moderate angles of inclination (the angle δ at the noses and at the center of the straight edge portion, respectively), the level difference between the bottom surface 26 and the chamfer surface 27 of the primary chamfer becomes very limited. More precisely, this level difference should never exceed 0.20 mm. The effect of this shallow and flat cutting geometry is that the heat that is generated in connection with the separation of chips from the workpiece is distributed and absorbed evenly along the different part surfaces which together form the cutting geometry surface of the cutting insert. In other words, the emergence of heat concentrations to individual projections, spaced-apart point by point on the cutting geometry surface, is avoided, which in turn efficiently counteracts the risk of crack formations in the material of the cutting insert.

Reference is now made to FIGS. 10–14, which illustrate a single-sided cutting insert. In this case, the chamfer surface 27 of the primary chamfer 24 constitutes the highest located part of the cutting geometry surface 7. In the section cuts A—A, B—B, C—C (FIGS. 12–14 respectively), a chip removing surface 25 extends, which is inclined at an angle (that in all section cuts may amount to 14°. Via a transition surface 35 having a radius R of, e.g., 1 mm, the chip removing surface 25 transforms into a chip deflection surface 26', which in this embodiment is in the form of a plane land. In the section cuts A—A and C—C, this land 26' transforms into a deepest located bottom surface 36 closer to the center of the cutting insert.

The elevation difference $N_1$ between the chamfer surface 27 and the chip deflection surface 26' may amount to 0.090 mm, whereby the elevation difference $N_2$ between the chip deflection surface 26' and a bottom surface 36, situated deepest in the cutting geometry surface, amounts to 0.035 mm. This means that the total elevation difference $N_3$ between the surfaces 27, 36 located highest and lowermost of the cutting geometry surface amounts to merely 0.125 mm. Also in this case, the chamfer angle χ may amount to 7°.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Cutting insert for chip removing machining of workpieces, comprising a body having opposite first and second surfaces interconnected by at least three side surfaces; wherein with the insert in an operative cutting state the first and second surfaces form a chip removing top flank surface and an inactive bottom flank surface, respectively; the top flank surface forming a cutting edge; the cutting edge including a generally convexly curved corner cutting edge portion which includes a nose intersected by an imaginary bisector of the corner cutting edge portion, and a surface-smoothing segment spaced from the bisector for smoothing a cut surface of the workpiece; the surface-smoothing segment including at least first, second and third part edge segments defined by first, second, and third radii, respectively which are larger than that of the nose; the first part edge segment disposed between the second and third part edge segments; each of the second and third radii being longer than the first radius.

2. The cutting insert according to claim 1 wherein each of the second and third radii is at least three times greater than the first radius.

3. The cutting insert according to claim 2 wherein each of the second and third radii is from 5 to 10 times greater than the first radius.

4. The cutting insert according to claim 2 wherein the body is of generally polygonal shape, adjacent ones of the side surfaces being interconnected by a convexly curved corner along which the curved cutting edge portion extends; the curved cutting edge portion including a convexly curved first edge segment defining the nose intersected by the imaginary bisector, a second edge segment disposed on a first side of the bisector, a third edge segment disposed on a second side of the bisector, and a fourth edge segment disposed between the first and third edge segments and defining the surface-smoothing segment.

5. The cutting insert according to claim 1 wherein the surface-smoothing segment has opposite ends; the second and third part edge segments being of equal length wherein the first part edge segment is located halfway between those opposite ends.

6. The cutting insert according to claim 1 wherein the first part edge segment has a length in the range of 1 to 15% of a length of the surface-smoothing segment.

7. The cutting insert according to claim 6 wherein the range is from 5 to 10%.

8. Cutting insert for chip removing machining of workpieces, comprising a body having opposite first and second surfaces interconnected by at least one side surface; wherein with the insert in an operative cutting state the first and second surfaces form a chip removing top flank surface and an inactive bottom flank surface, respectively; the top flank surface forming a cutting edge with the at least one side surface; the cutting edge including a surface-smoothing segment for smoothing a cut surface of the workpiece; the surface-smoothing segment including at least first, second and third part edge segments defined by first, second, and third radii, respectively; the first part edge segment disposed between the second and third part edge segments; each of the second and third radii being longer than the first radius;

wherein there are at least three side surfaces and the body is of generally polygonal shape, adjacent ones of the side surfaces being interconnected by a convexly curved corner along which a curved portion of the cutting edge extends; the curved portion of the cutting edge including a convexly curved first edge segment defining a nose intersected by an imaginary bisector of the corner, a second edge segment disposed on a first side of the bisector, a third edge segment disposed on a second side of the bisector, and a fourth edge segment disposed between the first and third edge segments and defining the surface-smoothing segment; and a convexly curved transition edge segment extending from one end of the first edge segment to an end point of the fourth edge segment; wherein a first imaginary line tangent to the first part edge segment forms an acute angle with a second imaginary line extending through both the end point of the fourth edge segment and an origin of a radius defining the transition edge segment.

9. The cutting insert according to claim 8 wherein the acute angle is substantially 88 degrees.

10. Cutting insert for chip removing machining of workpieces, comprising a body having opposite first and second surfaces interconnected by at least one side surface; wherein with the insert in an operative cutting state the first and second surfaces form a chip removing top flank surface and an inactive bottom flank surface, respectively; the top flank surface forming a cutting edge with the at least one side surface; the cutting edge including a surface-smoothing segment for smoothing a cut surface of the workpiece; the surface-smoothing segment including at least first, second and third part edge segments defined by first, second, and third radii, respectively; the first part edge segment disposed between the second and third part edge segments; each of the second and third radii being longer than the first radius;

wherein the top flank further includes a cutting geometry surface extending from the cutting edge, the cutting geometry surface including a primary chamfer extending inwardly from the cutting edge and transforming into a chip removing surface which is inclined in an inwards and downwards direction from the primary chamfer, the chip removing surface transforming into a deflection surface for initiating deflection of a chip during a cutting operation; an angle formed between the chip removing surface and a reference center plane extending through the insert parallel to the top and bottom flanks, which angle is no greater than 18°, the chip deflection surface being at an elevation spaced from a highest point of the primary chamfer by a distance no greater than 0.20 mm.

11. The cutting insert according to claim 10 wherein the angle formed between the chip removing surface and the reference plane is in the range of 3–18 degrees.

12. The cutting insert according to claim 11 wherein the angle is in the range of 10–15 degrees.

13. The cutting insert according to claim 12 wherein the chip deflection surface comprises a bottom surface which transforms into a plane land through a concavely curved chip breaking surface, the land extending toward a center of the insert on an elevation between the elevation of the chip deflection surface and the elevation of the highest point of the primary chamfer.

14. The cutting insert according to claim 13 wherein the elevation of the land is spaced from the elevation of the highest point of the primary chamfer by a distance greater than a distance between the elevation of the land and the elevation of the chip deflection surface.

15. The cutting insert according to claim 12 wherein the chip deflection surface comprises a plane land which transforms into a deeper bottom surface.

16. The cutting insert according to claim 12 wherein the primary chamfer, the chip removing surface, and the chip deflection surface comprises smooth surfaces absent abrupt projections.

17. The cutting insert according to claim 10 wherein the distance between the elevation of the chip deflection surface and the highest point of the primary chamfer is in the range of 0.06–0.16 mm.

18. The cutting insert according to claim 17 wherein the distance is in the range of 0.090–0.125 mm.

* * * * *